US010165265B2

(12) United States Patent
Derenick et al.

(10) Patent No.: US 10,165,265 B2
(45) Date of Patent: Dec. 25, 2018

(54) ONLINE SENSOR CALIBRATION VERIFICATION SYSTEM

(71) Applicant: SIKORSKY AIRCRAFT CORPORATION, Stratford, CT (US)

(72) Inventors: Jason C. Derenick, Hamden, CT (US); Xuchu Ding, Manchester, CT (US); Shuo Zhang, Manchester, CT (US); Igor Cherepinsky, Sandy Hook, CT (US); Joshua M. Leland, Milford, CT (US); Christopher Stathis, Hamden, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/328,782

(22) PCT Filed: Sep. 29, 2015

(86) PCT No.: PCT/US2015/052885
§ 371 (c)(1),
(2) Date: Jan. 24, 2017

(87) PCT Pub. No.: WO2016/054004
PCT Pub. Date: Apr. 7, 2016

(65) Prior Publication Data
US 2017/0223346 A1    Aug. 3, 2017

Related U.S. Application Data

(60) Provisional application No. 62/057,552, filed on Sep. 30, 2014.

(51) Int. Cl.
*B64C 39/02*   (2006.01)
*G06T 7/80*    (2017.01)
*H04N 17/00*   (2006.01)

(52) U.S. Cl.
CPC ......... *H04N 17/002* (2013.01); *B64C 39/024* (2013.01); *G06T 7/80* (2017.01); *B64C 2201/123* (2013.01); *B64C 2201/141* (2013.01)

(58) Field of Classification Search
CPC .. G06T 7/00; G06T 7/80; B64C 39/00; B64C 39/024; H04N 17/00; H04N 17/002
See application file for complete search history.

(56) References Cited

U.S. PATENT DOCUMENTS 4,967,370 A  10/1990  Stern et al.
5,479,079 A  12/1995  Jeong et al.
(Continued)

FOREIGN PATENT DOCUMENTS

WO  2014049372 A1  4/2014

OTHER PUBLICATIONS

International Search Report for International Appln. No. PCT/US2015/052885; International Filing Date: Sep. 29, 2015; dated Jan. 4, 2016; 6 pages.
(Continued)

*Primary Examiner* — Yonel Beaulieu
(74) *Attorney, Agent, or Firm* — Cantor Colburn LLP (57) ABSTRACT

An online sensor calibration verification system includes at least one sensor configured to extract a calibration feature included in a field of view of the sensor. The online sensor calibration verification system further includes an electronic calibration verification module configured to determine a static reference feature model, and to verify a calibration of the at least one sensor based on a positional relationship between an extracted calibration feature and the static reference feature model.

15 Claims, 8 Drawing Sheets

(56) References Cited

U.S. PATENT DOCUMENTS

| | | | |
|---|---|---|---|
| 6,393,370 B1 | 5/2002 | Soika | |
| 6,970,802 B2 | 11/2005 | Ban et al. | |
| 9,223,089 B1* | 12/2015 | Griffin | G02B 6/2551 |
| 9,430,822 B2* | 8/2016 | Irschara | G06T 7/00 |
| 2003/0030638 A1 | 2/2003 | Astrom et al. | |
| 2011/0122257 A1 | 5/2011 | Kirk | |
| 2014/0368651 A1* | 12/2014 | Irschara | G06T 7/00 348/148 |

OTHER PUBLICATIONS

Written Opinion of the International Searching Authority for International Appln. No. PCT/US2015/052885; International Filing Date: Sep. 29, 2015; dated Jan. 4, 2016; 4 pages.

\* cited by examiner

ONLINE SENSOR CALIBRATION VERIFICATION SYSTEM

CROSS REFERENCE TO RELATED APPLICATIONS

This application is a National Stage application of PCT/US2015/052885, filed Sep. 29, 2015, which claims the benefit of U.S. Provisional Application No. 62/057,552, filed Sep. 30, 2014, both of which are incorporated by reference in their entirety herein.

TECHNICAL FIELD

The present invention is related generally to sensor systems, and more particularly, to an online sensor calibration verification system for autonomous vehicles.

BACKGROUND

Autonomous vehicles such as, for example, unmanned aerial vehicles, typically include one or more calibrated sensors that are mounted (damped or directly affixed) to the vehicle frame. The sensors included on autonomous vehicles are combined to construct a multi-spectral sensing payload (e.g. LIDAR, SONAR, EO cameras, etc.) that is used in conjunction with real-time sensor fusion and perception algorithms to extract features, objects and/or regions within the operating environment of the vehicle. Unfortunately, the utility of the vehicle's sensing payload for closing the loop in this manner is conditioned upon an underlying assumption that the extrinsic calibration parameters (i.e., the value parameters capturing the relative pose of the sensor with respect to a predefined vehicle body frame) remain as reliable approximations of the true sensor pose between calibrations. This assumption does not always hold true, especially when one considers potential sensor perturbations. Under such circumstances, the sensor may (depending upon the severity of the perturbation) continue to report reasonable sensor measurements in its local frame (i.e., the sensor itself is operating as expected). These measurements, however, will not be properly integrated into the vehicle's world model as the underlying geometric model has fundamentally changed. Furthermore, incorporating the measured output of one or more uncalibrated sensors creates an inaccurate world model.

SUMMARY

According to a non-limiting embodiment, an online sensor calibration verification system comprises at least one sensor configured to extract a calibration feature formed on a portion of an unmanned vehicle included in a field of view of the sensor. An electronic calibration verification module is configured to determine a static reference feature model, and to verify calibration of the at least one sensor based on a positional relationship between an extracted calibration feature and the static reference feature model.

In addition to one or more of the features described above or below, or as an alternative, further embodiments include the following features:

a feature, wherein the electronic calibration verification module determines the at least one sensor is calibrated when a first orientation of the extracted calibration feature matches a second orientation of the static reference feature model, and wherein the electronic calibration verification module determines the at least one sensor is uncalibrated when the first orientation of the extracted calibration feature is displaced with respect to the second orientation of the static reference feature model;

a feature wherein the calibration feature is at least one feature selected from a group comprising a component part number, surface features, geometric vehicle structures, and a matrix bar code, and wherein the sensor is a camera;

a feature, wherein the calibration feature is continuously extracted without interruption;

a feature, wherein the calibration feature is periodically extracted according to a predetermined time period;

an electronic world model unit in signal communication with the at least one sensor, the electronic world model unit configured to selectively input at least one measured data value output from the at least one sensor to generate a world model that controls an unmanned vehicle;

a feature, wherein the electronic world model unit is in signal communication with the electronic calibration verification module, and wherein the electronic world model unit incorporates the at least one measured data value into the world model in response to the electronic calibration verification module determining the at least one sensor is calibrated; and a feature, wherein the electronic world model excludes the at least one measured data value from the world model in response to the electronic calibration verification module determining the at least one sensor is uncalibrated.

According to another non-limiting embodiment, a method of verifying calibration of an online sensor comprises extracting a calibration feature included in a field of view of at least one sensor, determining a static reference feature model, and verifying a calibration of the at least one sensor based on a positional relationship between an extracted calibration feature and the static reference feature model.

In addition to one or more of the features described above or below, or as an alternative, further embodiments include the following features:

determining the at least one sensor is calibrated when a first orientation of the extracted calibration feature matches a second orientation of the static reference feature model, and determining the at least one sensor is uncalibrated when the first orientation of the extracted calibration feature is displaced with respect to the second orientation of the static reference feature model;

extracting the calibration feature continuously without interruption;

extracting the calibration feature periodically according to a predetermined time period;

selectively processing at least one measured data value output from the at least one sensor to generate a world model that controls an unmanned vehicle;

incorporating the at least one measured data value into the world model in response to the electronic calibration verification module determining the at least one sensor is calibrated; and excluding the at least one measured data value from the world model in response to the electronic calibration verification module determining the at least one sensor is uncalibrated.

Technical effects provided by at least one embodiment include exploiting various airframe features (e.g., detectible fiduciary marks or surface features that together enable a unique relative pose estimate) to determine online detection of sensor faults and online calibration verification of one or more sensors by monitoring the feature, feature location, scale and/or orientation. In addition, at least one embodiment requires only a nominal reference model of tracked features computed at the time of extrinsic calibration for each sensor. Further, at least one embodiment enables the autonomous disregarding of fault sensor measurements to prevent corruption of a world model map used by a respective autonomous vehicle. In addition, even in non-fault conditions (e.g., under normal operation when sensors are within a calibration tolerance) at least one embodiment is capable of reporting the accuracy of the calibration at vehicle startup and/or while the vehicle travels.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

As used herein, the term module refers to a hardware module including an Application Specific Integrated Circuit (ASIC), an electronic circuit, a processor (shared, dedicated, or group) and memory that execute one or more software or firmware programs, a combinational logic circuit, and/or other suitable components that provide the described functionality One or more non-limiting embodiments described herein exploit the fact that sensors installed on autonomous vehicles often have a portion of the vehicle's surface exterior (e.g. vehicle frame) subtending some portion of the solid angle comprising their field-of-view. In this manner, at least one non-limiting embodiment of the disclosure identifies an invalid sensor calibration by actively monitoring perceived changes in the relative pose of a uniquely identifiable set of features located upon the vehicle's exterior surface. A unique feature includes detectible fiduciary marks, surface features and/or geometric vehicle structures that are readily detected by onboard sensors of the vehicle. The ability to monitor the sensor outputs (e.g. image) with respect to a known fixed feature or structure of the vehicle allows for detecting a perturbation of one or more sensors. The estimated location, scale and orientation of the feature set can be used to define a signature of the sensor. The signal can be compared to a static reference model (e.g. the local sensor frame) captured at the time of extrinsic sensor calibration. If during operation the signature of the tracked markings changes beyond some predefined tolerance, the affected sensor's output can be discarded and/or, a covariance value can be assigned to the output which reflects the confidence in reported measurements from the failing sensor. In this manner, the integrity of the world model that incorporates output data generated from one or more is maintained.

Figure 1A:
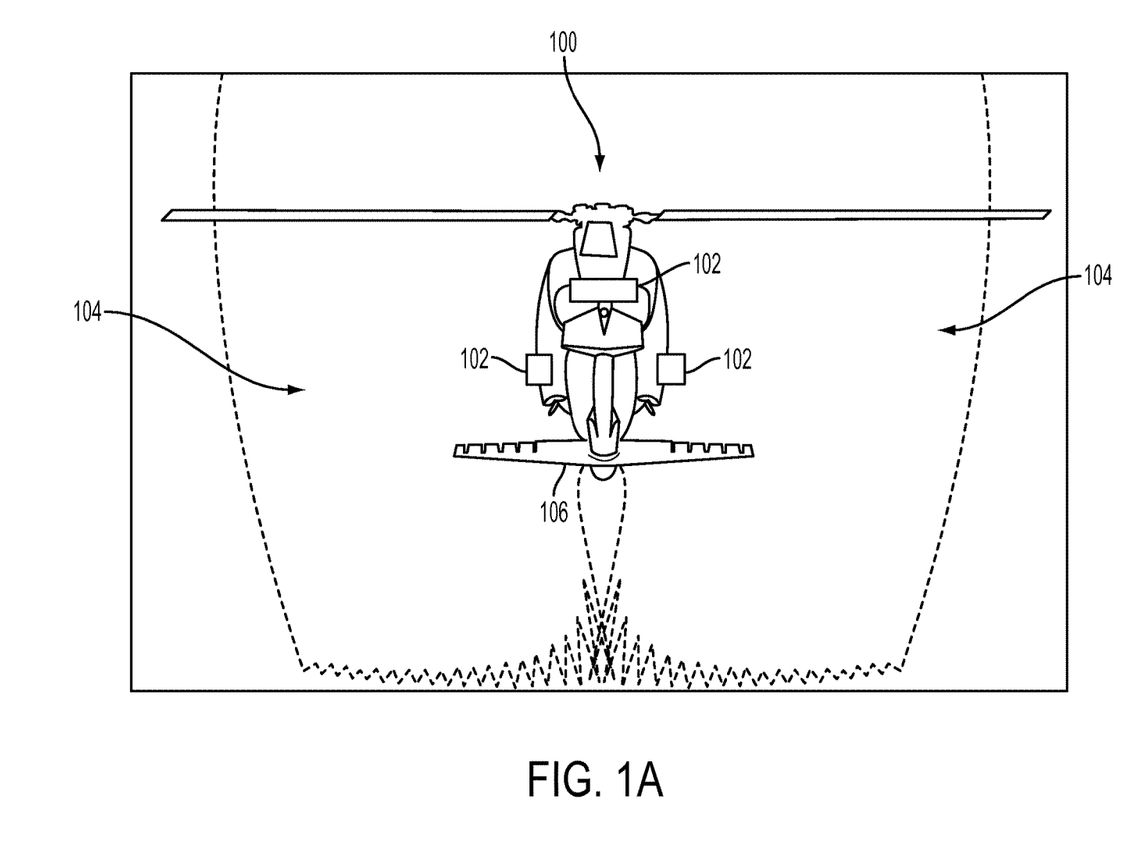
FIG. 1A is a top-rear view of an unmanned vehicle (UV) illustrating sensors having a field of view that includes a rear portion of the UAV according to an non-limiting embodiment.
Figure 1B:
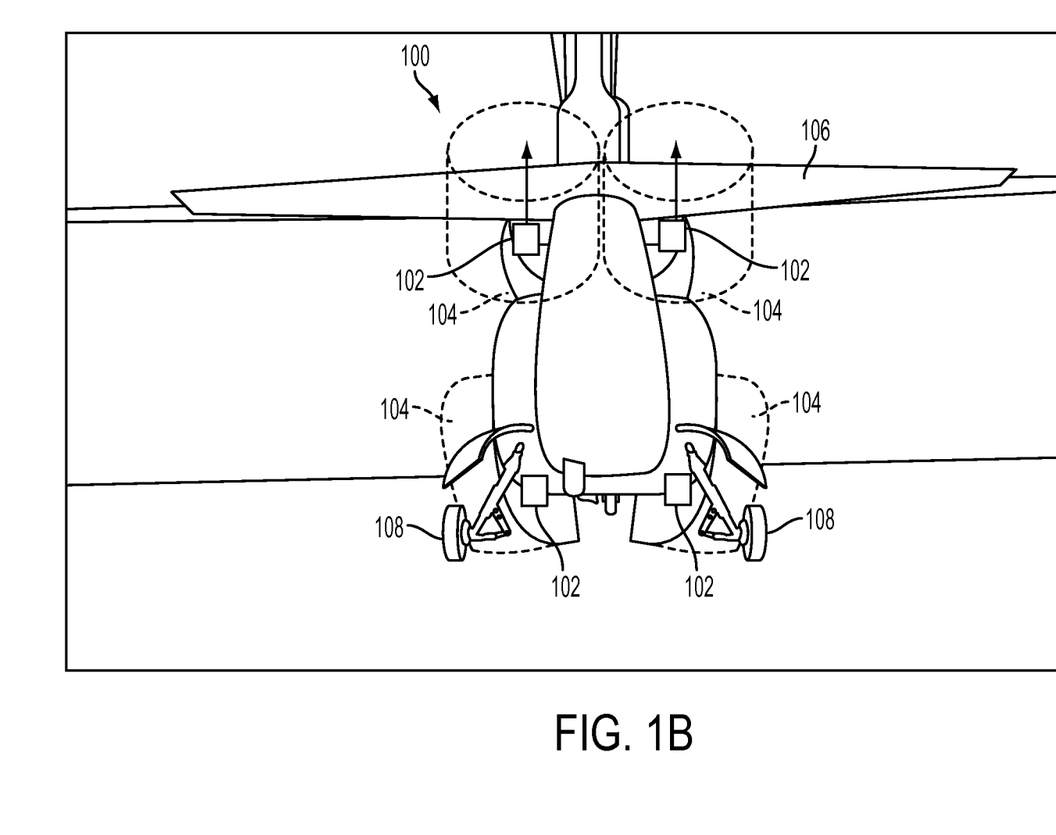
FIG. 1B is a bottom-rear view of the UV illustrated in FIG. 1A showing a field of view of a second set of sensors according to an non-limiting embodiment.
Figure 4:
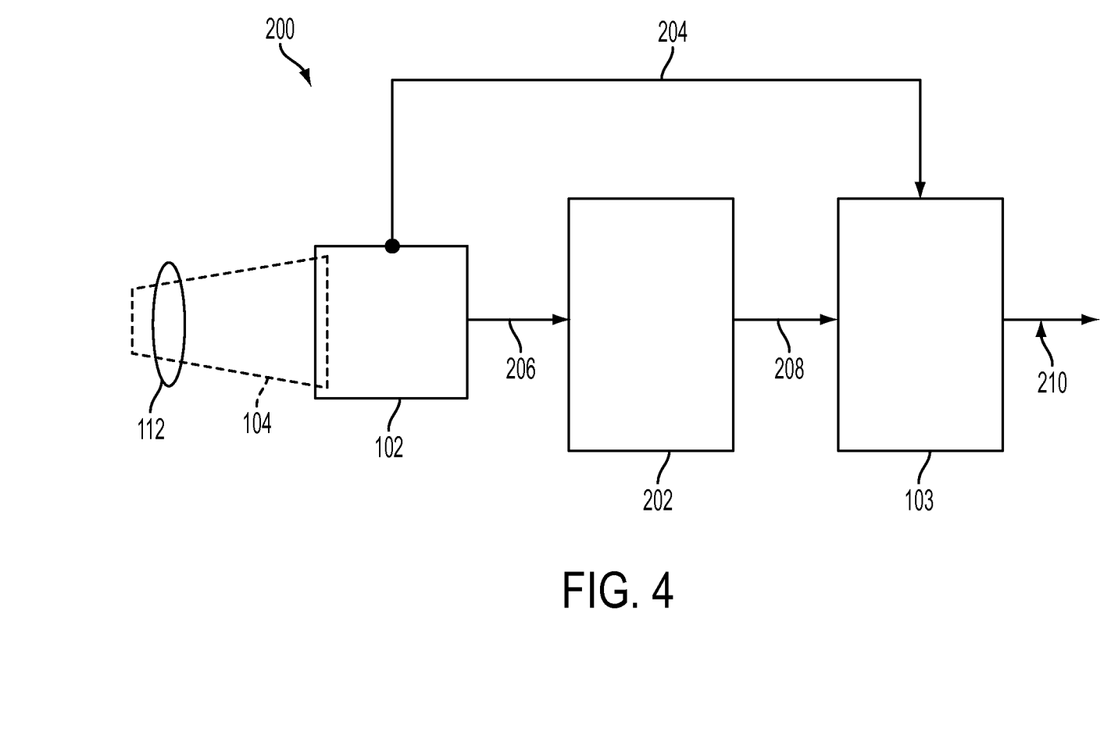
FIG. 4 is a block diagram illustrating an online sensor calibration validation system according to an non-limiting embodiment.

Referring to FIGS. 1A-1B, an unmanned aerial vehicle (UAV) 100 is illustrated according to a non-limiting embodiment. The UAV 100 includes a plurality of sensors 102, and an electronic world model unit 103 (FIG. 4). A sensor 102 can be formed as various devices capable of detecting and extracting features of the UAV 100 including, but not limited to, a camera, a LIDAR sensor, and surface reflector sensors. Although a UAV 100 is illustrated, one or more sensors 102 may be installed on various other types of UVs including, but not limited to, unmanned ground vehicles (UGVs), unmanned surface vehicles (USVs), and unmanned underwater vehicles (UUVs).

The sensors 102 generate an output (e.g. a captured image) according to a field of view (FOV) 104. In this case, an aircraft tail assembly 106 and landing gear assembly 108 extend into the FOV 104 of sensors 102, respectively. In addition, the sensors 102 output measured data corresponding to the UAV and the UAV's surrounding environment. The electronic world model unit 103 is in signal communication with the one or more sensors 102. Based on the information output by the sensors 102 and the calibration status of the sensors 102, the electronic world model unit 103 generates a world model (i.e., an electronic model of the vehicle's surrounding environment).

Figure 2A:
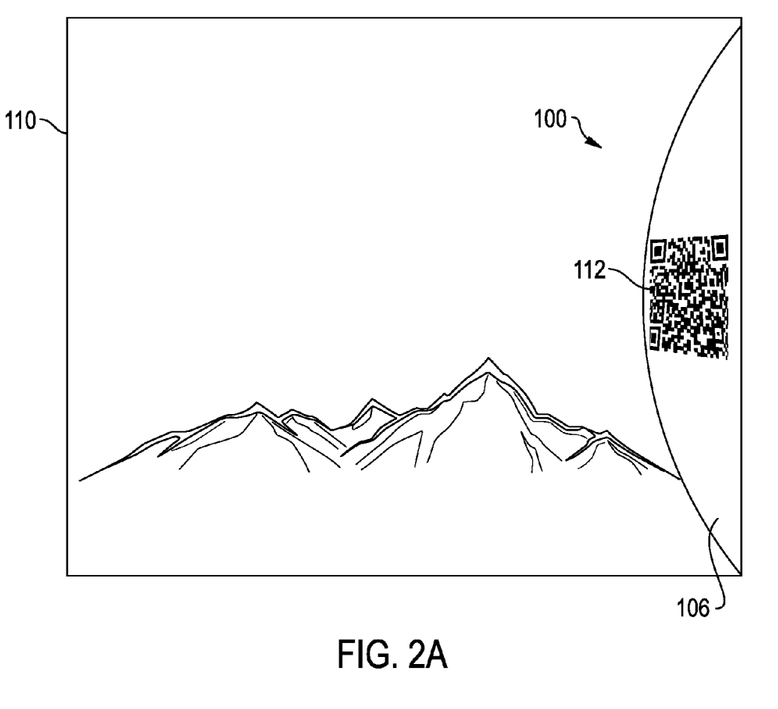
FIG. 2A is a valid image generated by an image sensor installed on a UV according to an non-limiting embodiment.
Figure 2B:
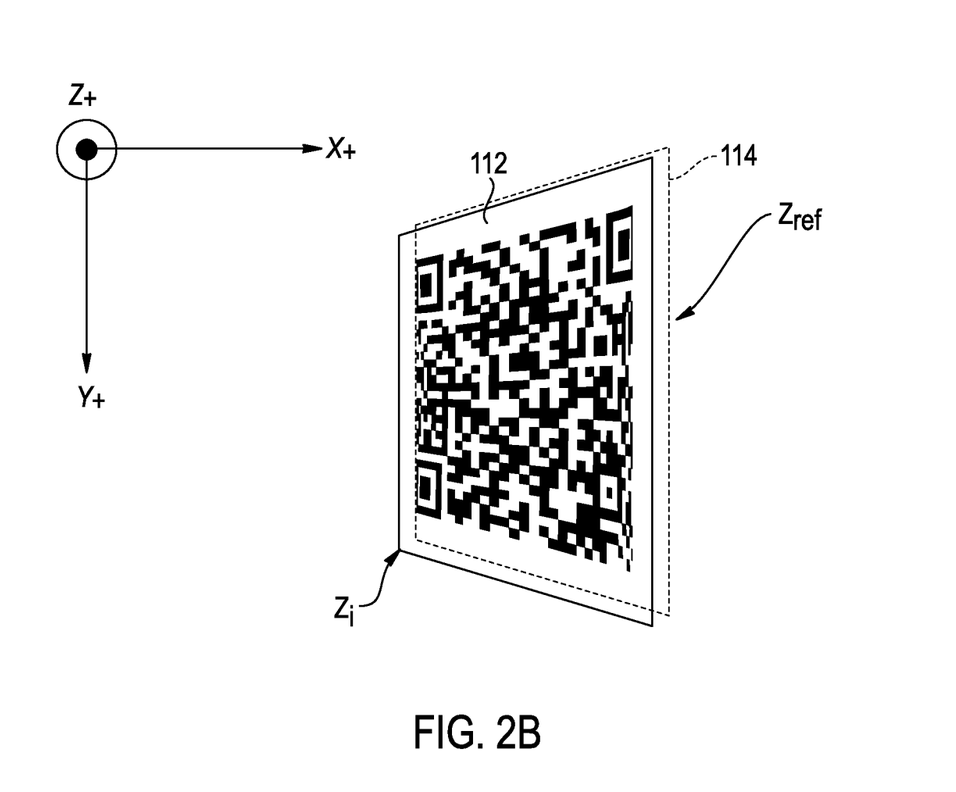
FIG. 2B is a captured image of a valid calibration feature aligned with respect to a reference model according to an non-limiting embodiment.

Turning now to FIGS. 2A-2B, a captured image 110 generated by one or more images sensors 102 is illustrated according to a non-limiting embodiment. The captured image 110 shows a portion of a UAV 100 such as, for example, an aircraft tail assembly 106. The aircraft tail assembly 106 includes a unique calibration feature 112 formed thereon. Since the calibration feature 112 is formed on a fixed portion of the UAV 100, the calibration feature 112 remains static/fixed along with the portion of the UAV 100. It is appreciated, however, that the calibration feature 112 can be formed on one or more other fixed portions of the UAV 100, which extends into the field of view of a sensor 102. In this case, the calibration feature 112 is a matrix bar code (i.e., a QR code). It is appreciated, however, that the calibration feature 112 may include other detectible fiduciary marks, component part numbers, surface features, and/or geometric vehicle structures that are readily detected by one or more sensors 102.

The calibration feature 112 is initially determined to exist in an initial feature orientation (Zi) with respect to a fixed reference orientation (Zref) of a reference plane 114. The calibration feature 112 can move with respect to the fixed reference plane 114. When one or more sensors 102 are calibrated as illustrated in FIGS. 2A-2B, the initial orientation (Zi) (i.e., the X, Y, Z coordinates) of the calibration feature 112 matches or approximately matches the reference orientation (Zref) of the reference plane 114.

Figure 3A:
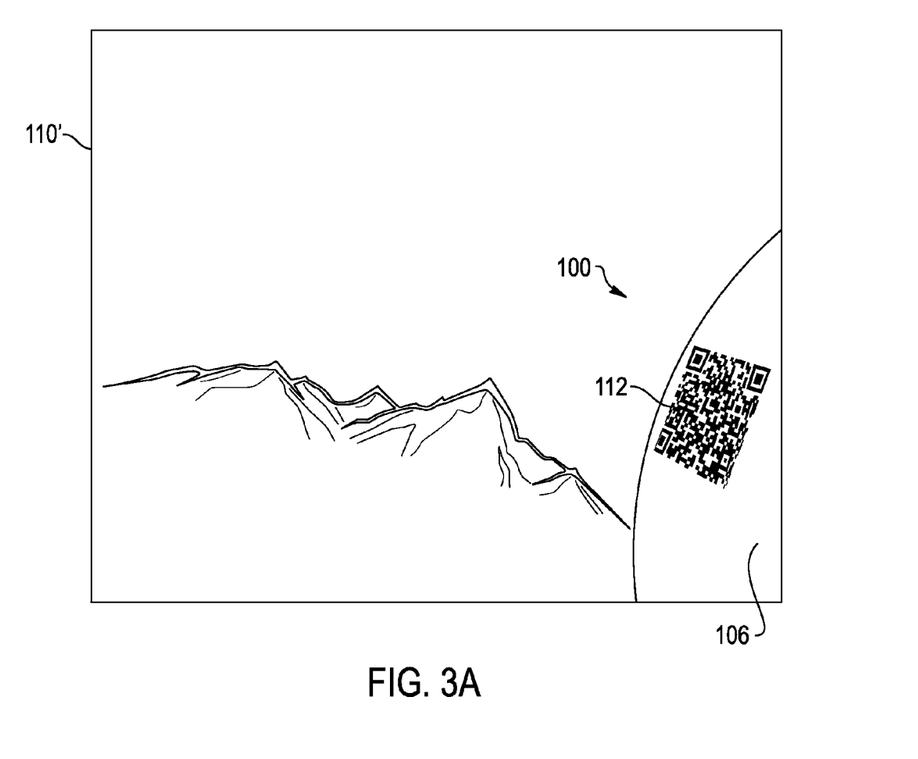
FIG. 3A is an invalid image that is generated following a perturbation of the image sensor of FIG. 2A according to an non-limiting embodiment.
Figure 3B:
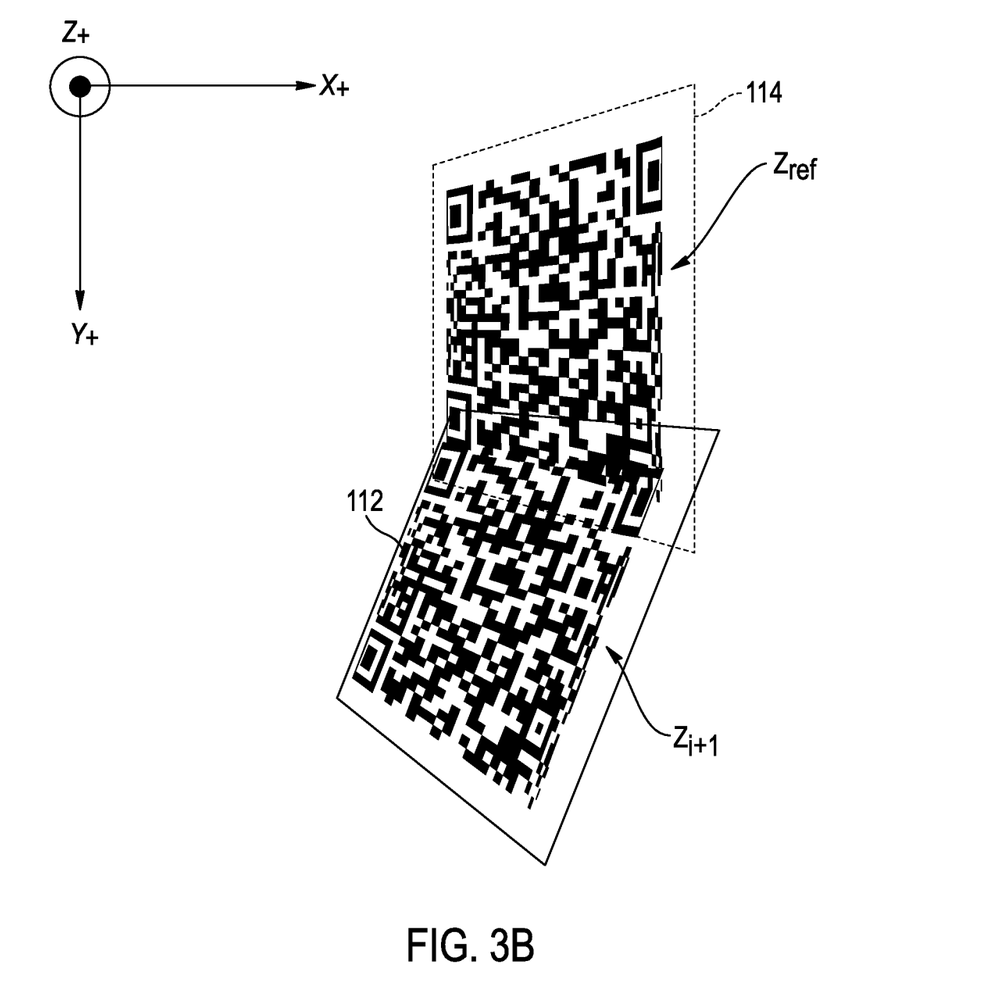
FIG. 3B is a captured image of an invalid calibration feature that is misaligned with respect to a reference model according to an non-limiting embodiment.

With reference to FIG. 3A, a second captured image 110' from the same sensor 102 is illustrated. In this case, the second captured image 110' shows a change in the orientation of the aircraft tail assembly 106 and thus, the calibration feature 112. As illustrated in FIG. 3B, the calibration feature 112 is moved into a shifted orientation (Zi+1), which is displaced with respect to a fixed reference orientation (Zref). In this manner, one or more images sensors 102 monitoring the QR code 112 are determined to be un-calibrated or faulty. An un-calibrated sensor may include, for example, a misaligned sensor. Although the calibration of the sensor 102 is determined based on the displacement of the QR code 112, it is appreciated that a reference orientation of a fixed feature of the UAV 100 such as, for example, the tail assembly 106, can be used to determine the calibration of one or more sensors in a similar manner. Although a position of a calibration feature 112 is monitored to determine the calibration of the sensor, it is appreciated that other signature characteristics of the calibration feature 112 can be monitored including, but not limited to a scale of the calibration feature 112. According to a non-limiting embodiment, the calibration of one or more sensors 102 is based on a comparison between the total displacement between the calibration feature 112 and the fixed reference plane 114, and a threshold value. In this manner, one or more images sensors 102 are determined to be un-calibrated or faulty when the total displacement exceeds the threshold value.

Referring now to FIG. 4, an online sensor calibration verification system 200 is illustrated according to a non-limiting embodiment. The sensor calibration verification system 200 includes one or more sensors 102 (e.g. a camera 102), an electronic calibration verification module 202, and an electronic world model unit 103. The sensor 102 detects a calibration feature 112 (e.g. a QR code) that is located in a respective FOV 114 as discussed in detail above. The sensor 102 also outputs various types of measured data 204 which is received by the 103 and used to generate a world model for operating a respective UV. According to a non-limiting embodiment, the sensor 102 continuously monitors an initial orientation (Zi) of the calibration feature 112 with respect to a fixed reference orientation (Zref) of a reference plane 114, and outputs an alignment signal 206 indicating the monitored orientation. It is appreciated, however, that the sensor 102 can be controlled to monitor the calibration feature 112 according to a pre-set time period. The pre-set time period can be every 5 minutes, for example.

According to a non-limiting embodiment, when the total displacement between the initial orientation (Zi) and the fixed reference orientation (Zref) is equal to or less than a threshold value, for example, the calibration verification module 202 outputs a calibration signal 208 verifying that the sensor 102 is calibrated. In response to receiving the calibration signal 208 verifying that the sensor 102 is calibrated, the electronic world model unit 103 incorporates the measured data 204 that is output from the sensor 102 to generate a world model. A world model signal 210 indicative of a world model is then output from the electronic world model unit 103, which can be used to control a respective UV.

When, however, the alignment signal 206 indicates that the total displacement exceeds the threshold value, the calibration verification module 202 outputs a calibration signal 208 indicating that the sensor 102 is not calibrated, e.g. misaligned. In response to receiving the calibration signal 208 indicating the sensor 102 is not calibrated, the electronic world model unit 103 gates off, i.e., discards, the measured data 204 that is output from the sensor 102. In this manner, inaccurate data output from an un-calibrated sensor is prevented from corrupting the world model generated by the electronic world model unit 103. According to another embodiment, the electronic world model unit 103 assigns a confidence to the measured data 204 that is output from the sensor 102 instead of completely disregarding the measured data 204. In this manner, the electronic world model unit 103 can generate a world model that adjusts various parameters to take into account the lower confidence data. The calibration verification module 202 can also be pre-programmed with a location of one or more of the sensors 102 outputting the respective 204 and 206. In this manner, the calibration verification module 202 can identify the specific sensor 102 and/or sensor location that is not calibrated.

Figure 5:
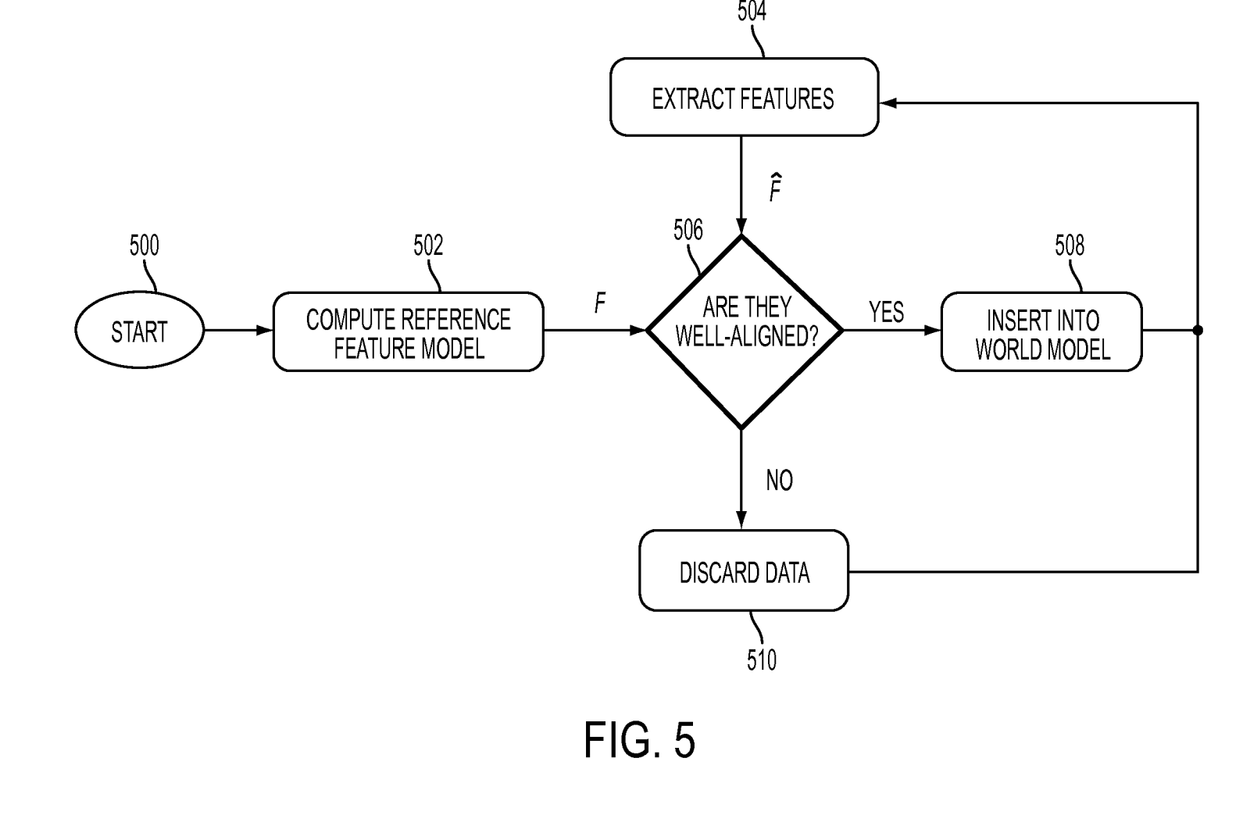
FIG. 5 is a flow diagram illustrating a method of detecting a faulty sensor included in an online sensor calibration validation system according to a non-limiting embodiment.

Turning now to FIG. 5, a flow diagram illustrates a method of performing an online verification of the calibration of one or more sensors included in a UV according to a non-limiting embodiment. The method begins at operation 500, and at operation 502 a reference feature model is computed. According to a non-limiting embodiment, the reference feature model is calculated when initially installing a corresponding sensor. The reference feature model can be stored in a memory of the calibration verification module for future reference. At operation 504, one or more sensors extract one or more unique features of the UV. The unique features include, for example, a QR code formed on a fixed reference feature of the UV. According to an embodiment, the feature can be extracted upon startup, i.e., initialization of the UV. In addition, the feature can be continuously extracted without interruption during the operation of the UV, or can be periodically extracted according to a set time period, e.g. every 2 minutes. At operation 506, a comparison is performed to determine whether one or more of the extracted features match the respective computed reference feature model. The comparison can be performed at startup and/or while the vehicle travels. When an extracted feature matches the corresponding computed reference feature model, the measured data output by corresponding sensor that extracted the unique static feature is used to generate a world model at operation 508. When, however, an extracted feature does not match the corresponding computed reference feature model, the measured data output by corresponding sensor that extracted the unique feature is discarded at operation 510. Thus, the measured data output by the uncalibrated sensor is not input into the world model such that that integrity and accuracy of the world model is maintained.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An online sensor calibration verification system, comprising:
   at least one sensor configured to extract a calibration feature formed on a portion of an unmanned vehicle included in a field of view of the sensor; and
   an electronic calibration verification module configured to determine a static reference feature model, and to verify a calibration of the at least one sensor based on a comparison between a positional relationship between an extracted calibration feature and the static reference feature model and a threshold value.

2. The system of claim 1, wherein the electronic calibration verification module determines the at least one sensor is calibrated when the positional relationship between the extracted calibration feature and the static reference feature model is less than the threshold value, and wherein the electronic calibration verification module determines the at least one sensor is uncalibrated when the positional relationship between the extracted calibration feature and the static reference feature model is greater than the threshold value.

3. The system of claim 2, wherein the calibration feature is at least one feature selected from a group comprising a component part number, surface features, geometric vehicle structures, and a matrix bar code, and wherein the sensor is a camera.

4. The system of claim 3, wherein the calibration feature is continuously extracted without interruption.

5. The system of claim 3, wherein the calibration feature is periodically extracted according to a predetermined time period.

6. The system of claim 1, further comprising:
an electronic world model unit operable to generate a model of an environment surrounding the unmanned vehicle in signal communication with the at least one sensor, the electronic world model unit configured to selectively input at least one measured data value output from the at least one sensor to generate a world model that controls the unmanned vehicle.

7. The system of claim 6, wherein the electronic world model unit is in signal communication with the electronic calibration verification module, and wherein the electronic world model unit incorporates the at least one measured data value into the world model in response to the electronic calibration verification module determining the at least one sensor is calibrated.

8. The system of claim 7, wherein the electronic world model excludes the at least one measured data value from the world model in response to the electronic calibration verification module determining the at least one sensor is uncalibrated.

9. A method of verifying calibration of an online sensor, the method comprising:
extracting a calibration feature included in a field of view of at least one sensor;
determining a static reference feature model;
determining a positional relationship between the extracted calibration feature and the static reference feature model; and
verifying a calibration of the at least one sensor by comparing the positional relationship to a threshold value.

10. The method of claim 9, further comprising determining the at least one sensor is calibrated when the positional relationship between the extracted calibration feature and the static reference feature model is less than the threshold value, and determining the at least one sensor is uncalibrated when the positional relationship between the extracted calibration feature and the static reference feature model is greater than the threshold value.

11. The method of claim 10, further comprising extracting the calibration feature continuously without interruption.

12. The method of claim 10, further comprising extracting the calibration feature periodically according to a predetermined time period.

13. The method of claim 9, further comprising selectively processing at least one measured data value output from the at least one sensor to generate a world model of an environment surrounding the unmanned vehicle that controls an unmanned vehicle.

14. The method of claim 13, further comprising incorporating the at least one measured data value into the world model in response to the electronic calibration verification module determining the at least one sensor is calibrated.

15. The method of claim 14, further comprising excluding the at least one measured data value from the world model in response to the electronic calibration verification module determining the at least one sensor is uncalibrated.

* * * * *